(12) United States Patent
Subbaraman et al.

(10) Patent No.: US 11,280,642 B2
(45) Date of Patent: Mar. 22, 2022

(54) REFLECTIVE LONG PERIOD GRATING

(71) Applicant: BOISE STATE UNIVERSITY, Boise, ID (US)

(72) Inventors: Harish Subbaraman, Boise, ID (US); Sohel Rana, Boise, ID (US); Nirmala Kandadai, Boise, ID (US)

(73) Assignee: Boise State University, Boise, ID (US)

( * ) Notice: Subject to any disclaimer, the term of this patent is extended or adjusted under 35 U.S.C. 154(b) by 0 days.

(21) Appl. No.: 16/899,308

(22) Filed: Jun. 11, 2020

(65) Prior Publication Data
US 2020/0393272 A1 Dec. 17, 2020

Related U.S. Application Data

(60) Provisional application No. 62/859,834, filed on Jun. 11, 2019.

(51) Int. Cl.
| | |
|---|---|
| *G01D 5/353* | (2006.01) |
| *G01B 11/16* | (2006.01) |
| *G01K 11/32* | (2021.01) |
| *G02B 6/02* | (2006.01) |

(52) U.S. Cl.
CPC ......... *G01D 5/35354* (2013.01); *G01B 11/16* (2013.01); *G01K 11/32* (2013.01); *G02B 6/02095* (2013.01)

(58) Field of Classification Search
CPC .......... G01D 5/35354; G01D 5/35316; G01D 5/35367; G01K 11/32; G01K 11/3206; G01B 11/16; G01B 11/165; G02B 6/02095; G02B 2006/12138
See application file for complete search history.

(56) References Cited

U.S. PATENT DOCUMENTS 6,833,541 B2 * 12/2004 Shu ...................... G01B 11/165
250/227.14

\* cited by examiner

*Primary Examiner* — John Bedtelyon
(74) *Attorney, Agent, or Firm* — Parsons Behle & Latimer

(57) ABSTRACT

A reflection mode sensor system may include an optical fiber core and an optical fiber cladding. A first long period grating (LPG) may be positioned along the optical fiber core having a first grating period, a second LPG may be positioned along the optical fiber core having a second grating period, and a third LPG may be positioned along the optical fiber core having a third grating period. The grating periods may enable sensing of multiple parameters simultaneously. A metal coating may be applied to an end facet of the combined optical fiber core and optical fiber cladding. The metal coating may also cover a side surface of the optical fiber cladding along a length from the end facet. The metal coating may include a paste applied to the optical fiber core and the optical fiber cladding, where the paste has been cured, and includes a metal.

13 Claims, 8 Drawing Sheets

REFLECTIVE LONG PERIOD GRATING

CROSS-REFERENCE TO RELATED APPLICATIONS

This application claims priority to and the benefit of U.S. Provisional Patent Application No. 62/859,834, filed on Jun. 11, 2019, and entitled "Reflective Long Period Grating," the contents of which are hereby incorporated by reference herein in their entirety.

GOVERNMENT LICENSE RIGHTS

This invention was made with U.S. Government support under Contract No. DE-AC07-051D14517/00154754-00032 awarded by the Department of Energy. The Government has certain rights in this invention.

FIELD OF THE DISCLOSURE

This disclosure is generally related to the field of optical fiber applications and, in particular, to optical fiber with a reflective long period grating (LPG).

BACKGROUND

LPG sensors may be used to sense a parameter (such as temperature, strain, or refractive index) by making use of cladding modes within an optical fiber. The sensors work by coupling light from fundamental core mode to the cladding modes, which makes the LPG sensors sensitive to any change of external parameters due to the close proximity of the cladding to a surrounding environment. A detector at the other side of the optical fiber may detect dips in the transmitted light to determine temperature, strain, refractive indexes, or other environmental parameters. However, due to having a source at one end and a detector at the other end, typical LPG sensors may be limited in the ability to sense environmental parameters from long distances and in monitoring temperature or strain in small space where bending of the optical fiber can cause significant loss.

In some cases, sensing may be accomplished by transmitting light and detecting light at the same facet end of the optical fiber using reflected light. However, an interferometric fringe containing a reflected spectrum may make data interrogation difficult when using reflected light. The interference from the fringe may also prevent simultaneous detection of multiple parameters. Further, the power of the LPG reflection may be comparatively low. Reflected LPG can be also realized by thermal evaporation/sputtering technique or electroless and electroplating process. However, these methods are either expensive or time-consuming. Additionally, long-length of metal coating of the very delicate sensor using the aforementioned methods are challenging. Other disadvantages may exist.

SUMMARY

Disclosed are systems and methods that may overcome at least one of the disadvantages of typical LPG sensors. In an embodiment, a reflection mode sensor system includes an optical fiber core and an optical fiber cladding radially surrounding the optical fiber core. The system further includes a first LPG positioned along the optical core having a first grating period. The system also includes a second LPG along the optical core having a second grating period different from the first grating period.

In some embodiments, the first LPG and the second LPG enable simultaneous measurement of both a temperature and a strain adjacent to a portion of the cladding. In some embodiments, a distance between the first LPG and the second LPG is 1 mm. In some embodiments, the system includes a third LPG along the optical core having a third grating period different from the first grating period and the second grating period. In some embodiments, the first LPG, the second LPG, and the third LPG enable simultaneous measurement of each of a temperature, a strain, and a refractive index adjacent to a portion of the cladding. In some embodiments, the system includes a metal coating applied to an end facet of the combined optical fiber core and optical fiber cladding. In some embodiments, the metal coating includes a paste applied to the optical fiber core and the optical fiber cladding, where the paste has been cured, and where the paste includes a reflective metal. In some embodiments, the metal coating includes silver, aluminum, gold, or a combination thereof. In some embodiments, the metal coating covers a side surface of the optical fiber cladding along a length from the end facet. In some embodiments, the length is at least 1 cm, or the length is at least 100 cm.

In an embodiment, a reflection mode sensor system includes an optical fiber core and an optical fiber cladding radially surrounding the optical fiber core. The system includes a first LPG positioned along the optical core having a first grating period. The system further includes a metal coating applied to an end facet of the combined optical fiber core and optical fiber cladding, wherein the metal coating covers a side surface of the optical fiber cladding along a length from the end facet.

In some embodiments, the system includes a second LPG along the optical core having a second grating period different from the first grating period and a third LPG along the optical core having a third grating period different from the first grating period and the second grating period. In some embodiments, the first LPG, the second LPG, and the third LPG enable simultaneous measurement of each of a temperature, a strain, and a refractive index adjacent to a portion of the cladding. In some embodiments, the metal coating includes a paste applied to the optical fiber core and the optical fiber cladding, where the paste has been cured, and where the paste includes a reflective metal. In some embodiments, the metal coating includes silver, aluminum, gold, or a combination thereof. In some embodiments, the length is at least 1 cm or wherein the length is at least 100 cm.

In an embodiment, a reflection mode sensor method includes providing an optical fiber core and providing an optical fiber cladding radially surrounding the optical fiber core. The method further includes forming a first LPG positioned along the optical core having a first grating period. The method also includes applying a paste to an end facet of the combined optical fiber core and the optical fiber cladding, where the paste includes a reflective metal. The method includes curing the paste.

In some embodiments, the method includes forming a second LPG along the optical core having a second grating period different from the first grating period and forming a third LPG along the optical core having a third grating period different from the first grating period and the second grating period. In some embodiments, the method includes applying the paste to a side surface of the optical fiber cladding along a length from the end facet. In some embodiments, the method includes simultaneously measuring each of a temperature, a strain, and a refractive index adjacent to a portion of the cladding.

Figure 1:
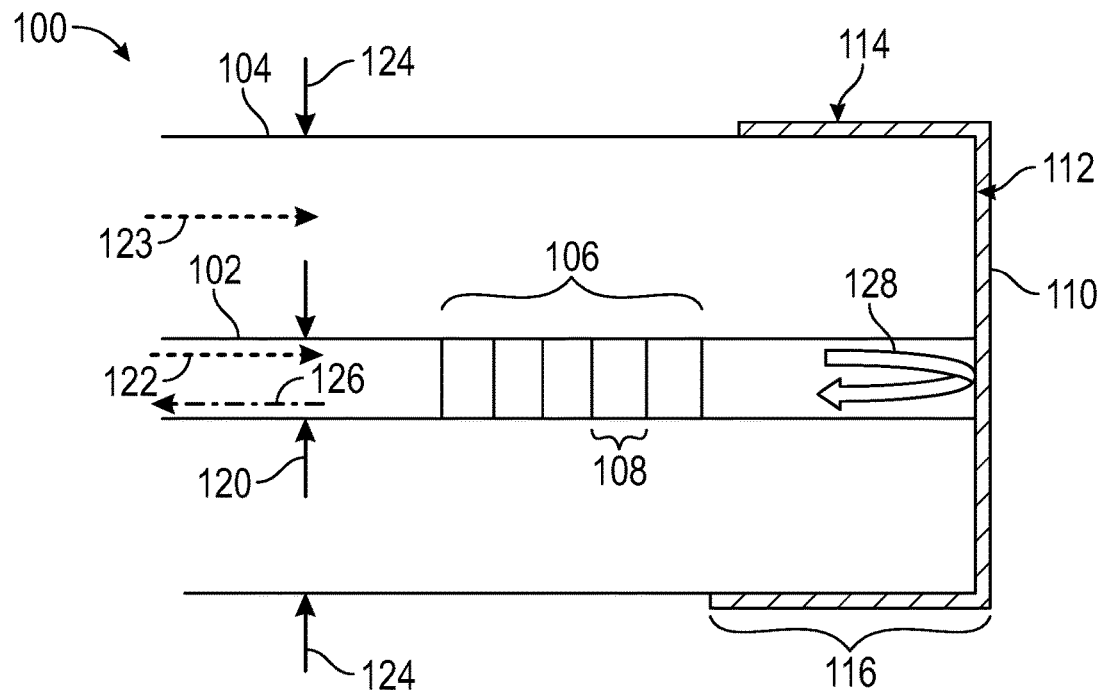
FIG. 1 is a cross-section view of an embodiment of a reflection mode sensor system having one LPG grating.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of a reflection mode sensor system 100 is depicted. The system 100 may include an optical fiber core 102 and an optical fiber cladding 104. The optical fiber cladding 104 may radially surround the optical fiber core 102. The optical core 102 may have a diameter 120 and the optical fiber cladding may have a diameter 124, which may be preselected to enable signal propagation at desired frequencies and in desired modes within the optical fiber core 102 and the optical fiber cladding 104.

The system 100 may include an LPG 106 positioned along the optical fiber core 102. The LPG 106 may have an associated grating period 108 (depicted as an interval of the LPG 106 for clarity), which may be sufficient to couple a core mode 122 within the optical fiber core 102 with a cladding mode 123 within the optical fiber cladding 104. Because the core mode 122 may be coupled with the cladding mode 123 within the optical fiber cladding 104, variations in external parameters, such as temperature, strain, or refractive index, may result in detectable light variations.

A metal coating 110 may be applied to an end facet 112 of the combined optical fiber core 102 and the optical fiber cladding 104. The metal coating 110 may also cover a portion of a side surface 114 of the optical fiber cladding 104 along a length 116 from the end facet 112. The length 116 of the metal coating 110 from the end facet 112 may be calculated based on the grating period 108 and other factors, or the length 116 may be experimentally determined. In at least one application, the length 116 may be at least 1 cm. In other applications, where less reflected fringe is desirable, the length 116 may be at least 100 cm.

The metal coating may be applied to the end facet 112 and the side surface 114 as a paste, which may then be cured. The paste may include a reflective metal. For example, the paste may include silver, aluminum, gold, another type of reflective metal, or a combination thereof.

During operation, the core mode 122 may be thought of as an incident light signal being passed through the optical fiber core 102. The incident light signal may be reflected with assistance from the metal coating 110, as depicted by the arrow 128, to form a reflected light signal 126. LPG works on the principle of light coupling between a fundamental core mode 122 and any number of co-propagating cladding modes 123. The phase matching condition of an LPG is given by:

$$\lambda = (n_{eff,co} - n_{eff,cl})\Lambda$$

where $n_{eff,co}$ is the effective refractive index of the guided core mode, $n_{eff,cl}$ is the effective refractive index of the $m^{th}$ order cladding mode, and $\Lambda$ is the grating period. The resonance wavelength can be tuned through the grating period or the refractive index of the fiber material.

As a result of the coupling between the core mode 122 and the cladding modes 123, a spectrum of the reflected light signal 126 may include a dip at one or more wavelengths corresponding to a resonant frequency associated with the LPG 106. Variations in the external parameters may result in variations in the wavelength associated with the dip, enabling measurement of the external parameters. Whether the external parameters that are measured include a temperature, a strain, a refractive index, or another type of external parameter may depend at least partially on the grating period 108.

The metal coating 110 may work as a reflective mirror in order to enable light generation and detection from a same end of the optical fiber core 102. Further, without the metal coating 110 along the length 116 of the side surface 114, an interferometric fringe may result in the reflected light signal 126. The interferometric fringe may make it difficult to determine the wavelength associated with the dip in the spectrum of the reflected light signal 126, which may in turn make it difficult to perform a measurement of the external parameters.

By including the metal coating 110 along the length 116 of the side surface 114 of the optical fiber cladding 104, the interferometric fringe may be reduced sufficiently to enable measurement of the one or more of the external parameters. Other advantages may exist.

Because of the high interference associated with typical reflection mode sensor systems, it may not be feasible to obtain multiple measurements using multiple LPGs within the optical fiber cores of these typical systems. However, the design parameters disclosed herein may enable multiple LPGs to be included within a single optical fiber core for simultaneous measurement of multiple parameters.

Figure 2:
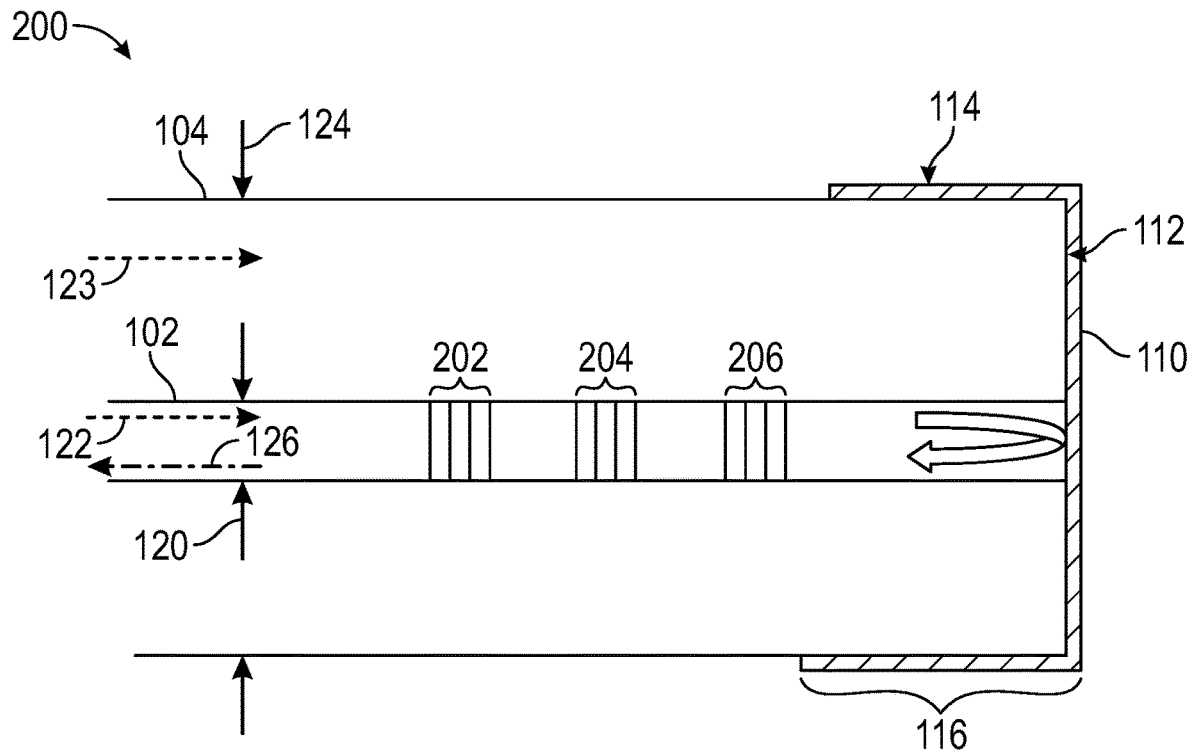
FIG. 2 is a cross-section view of an embodiment of a reflection mode sensor system having multiple LPG grating.

Referring to FIG. 2, an embodiment of a reflection mode sensor system 200 is depicted. The system 200 may include an optical fiber core 102 and an optical fiber cladding 104 radially surround the optical fiber core 102. The system 200 may also include a metal coating 110 applied to an end facet 112 of the combined optical fiber core 102 and the optical fiber cladding 104. The metal coating 110 may also cover a portion of a side surface 114 of the optical fiber cladding 104 along a length 116 from the end facet 112.

The system 200 may further include a first LPG 202 positioned along the optical core having a first grating period, a second LPG 204 having a second grating period different from the first grating period, and a third LPG 206 having a third grating period different from the first grating period and the second grating period. The distance between each of the LPGs 202, 204, 206 may be a fixed distance and may be greater than the associated grating periods. In an example, the distance between each LPG may be 1 mm.

As an incident light signal is reflected to result in a reflected light signal, the LPGs 202, 204, 206 may couple the core mode 122, to one or more cladding modes 123 propagating within the optical fiber cladding 104. Because there are multiple LPGs, multiple external parameters may be simultaneously measured based on the effect their variation may have on the spectrum of the reflected light signal 126. For example, the LPGs 202, 204, 206 may enable simultaneous measurement of each of a temperature, a strain, and a refractive index adjacent to a portion of the cladding.

FIGS. 3-6 relate to a particular embodiment in which a first LPG, e.g., the first LPG 202 has a grating period of 346 µm, a second LPG, e.g., the second LPG 204, has a grating period of 374 µm, and a third LPG, e.g., the third LPG 206, has a grating period of 390 µm. In each case, the number of grating periods may be 45. While these exemplary values are described for illustration purposes, the disclosure is not intended to be so limited. Other values are possible depending on a desired design application.

Figure 3:
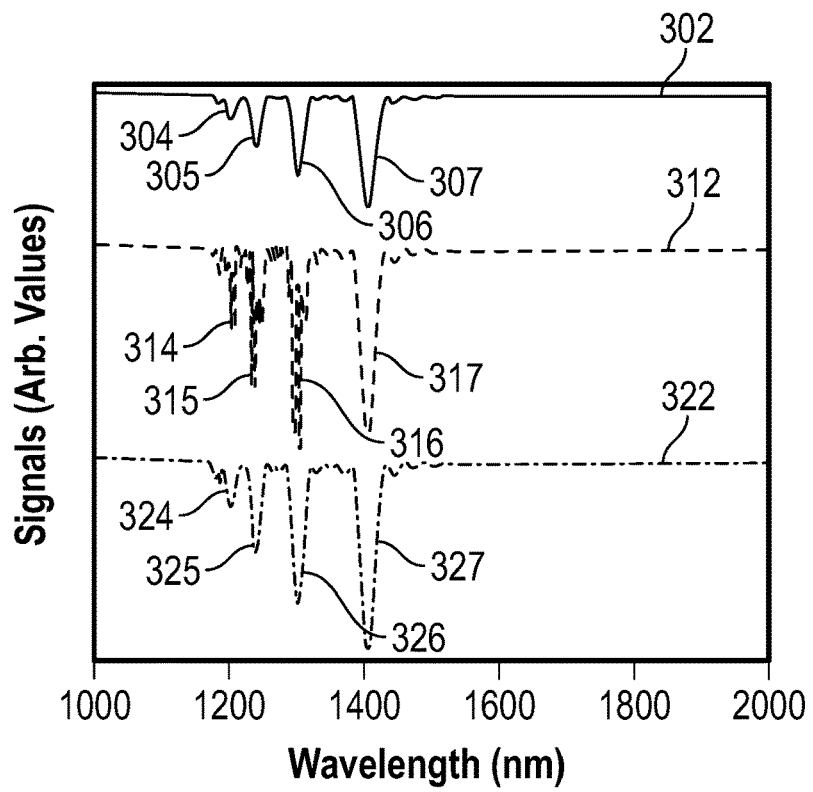
FIG. 3 depicts an example of measured transmitted and reflected spectrums of a first LPG.

Referring to FIG. 3, measured transmitted and reflected spectrums of a first LPG are depicted. The first LPG may correspond to the first LPG 202 and may have a grating period of 346 µm. A transmitted spectrum 302 was obtained by passing an incident light signal through an optical fiber core and measuring a spectrum associated with the incident light signal at an opposite end of the optical fiber core without reflecting the incident light signal. The transmitted spectrum 302 may have four dips 304, 305, 306, 307, indicating that the incident light signal couples to 4 co-propagating cladding modes. The fourth dip 307 indicates the highest order cladding mode, which has a wavelength of 1.4 µm (1400 nm).

A first reflected spectrum 312 was obtained by applying a metal coating as described herein and that extends along a side of the optical fiber cladding for a length of 1 cm from the end facet. As shown, the first reflected spectrum 312 has four dips 314, 315, 316, 317 that correspond to the four dips 304-307 of the transmitted spectrum 302. Therefore, the first reflected spectrum 312 is also a good indicator of the cladding modes. As variations occur in external parameters adjacent to the cladding, wavelengths of the cladding modes may be affected, thereby causing a shift in the dips 314-317. This may enable the first LPG to measure one external parameter, such as a temperature, a strain, or a refractive index.

The first reflected spectrum 312 may have some splitting of the dips 314-317. The reason may be that a length of the metal coating may not be sufficient to absorb all coupling wavelengths of the incident light signal. As a result, unabsorbed resonance wavelengths of light may reflect back from the metal coating on the cladding end facet and couple again with the core mode light signal at the grating location, thereby splitting the reflected spectrum.

In order to avoid splitting, a second reflected spectrum 322 was obtained by applying a metal coating as described herein and that extends along a side of the optical fiber cladding for a length of 100 cm from the end facet. As shown, the second reflected spectrum 322 has four dips 324, 325, 326, 327 that correspond to the four dips 304-307 of the transmitted spectrum 302 and the four dips 314-317 of the first reflected spectrum 312. However, the second reflected spectrum 322 may have less splitting, resulting in more stability.

In should be noted that although the metal coating has been tested at lengths of 1 cm and 100 cm, other lengths are possible. For example, some applications may use lengths between 1 cm and 100 cm. It should also be noted that the y-axis of the charts in FIGS. 3-6 are intended only to show dips and are not related to consistent signal amplitudes the spectrums 302, 312, 322.

Figure 4:
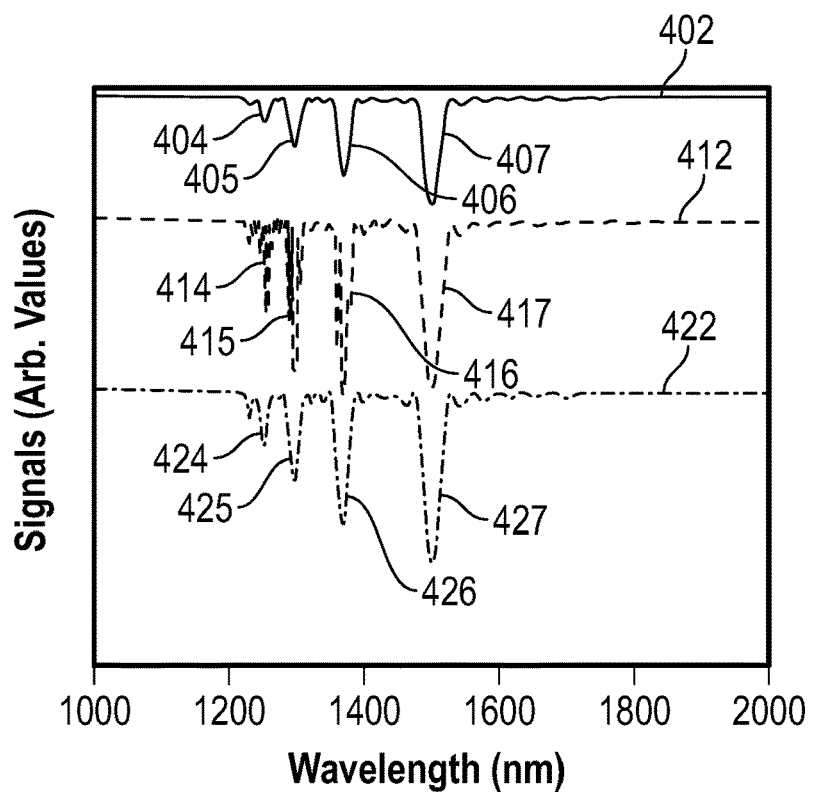
FIG. 4 depicts an example of measured transmitted and reflected spectrums of a second LPG.

Referring to FIG. 4, measured transmitted and reflected spectrums of a second LPG are depicted. The second LPG may correspond to the second LPG 204 and may have a grating period of 374 µm. A transmitted spectrum 402 may have four dips 404, 405, 406, 407, indicating that the incident light signal couples to 4 co-propagating cladding modes. The fourth dip 407 may indicate the highest order cladding mode, which has a wavelength of 1.5 µm (1500 nm). A first reflected spectrum 412 associated with a metal coating having a length of 1 cm was obtained. The first reflected spectrum 412 has four dips 414, 415, 416, 417 that correspond to the four dips 404-407 of the transmitted spectrum 402. A second reflected spectrum 422 associated with a metal coating having a length of 100 cm was obtained. The second reflected spectrum 422 has four dips 424, 425, 426, 427 that correspond to the four dips 404-407 of the transmitted spectrum 402 and the four dips 412-417 of the first reflected spectrum.

Figure 5:
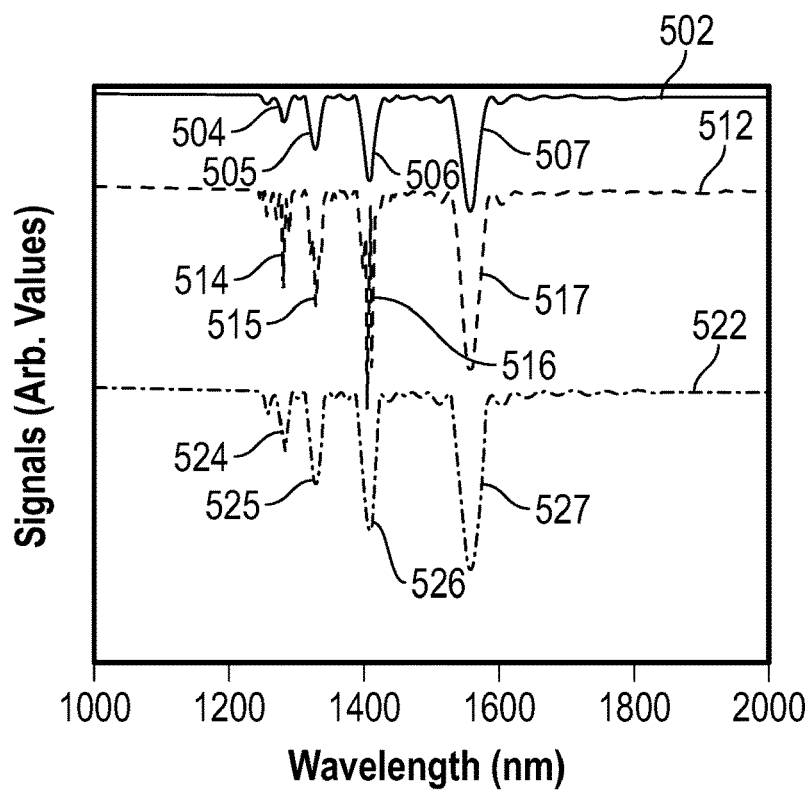
FIG. 5 depicts an example of measured transmitted and reflected spectrums of a third LPG.

Referring to FIG. 5, measured transmitted and reflected spectrums of a third LPG are depicted. The third LPG may correspond to the third LPG 206 and may have a grating period of 390 µm. A transmitted spectrum 502 may have four dips 504, 505, 506, 507, indicating that the incident light signal couples to 4 co-propagating cladding modes. The fourth dip 507 may indicate the highest order cladding mode, which has a wavelength of 1.56 µm (1560 nm). A first reflected spectrum 512 associated with a metal coating having a length of 1 cm was obtained. The first reflected spectrum 512 has four dips 514, 515, 516, 517 that correspond to the four dips 504-507 of the transmitted spectrum 502. A second reflected spectrum 522 associated with a metal coating having a length of 100 cm was obtained. The second reflected spectrum 522 has four dips 524, 525, 526, 527 that correspond to the four dips 504-507 of the transmitted spectrum 502 and the four dips 512-517 of the first reflected spectrum.

FIGS. 3-5 show that each of the example LPGs, individually, may be result in stable reflected spectrums when a metal coating of at least 1 cm is employed. Further, the reflected spectrums become more stable as the length of the metal coating is increased.

Figure 6:
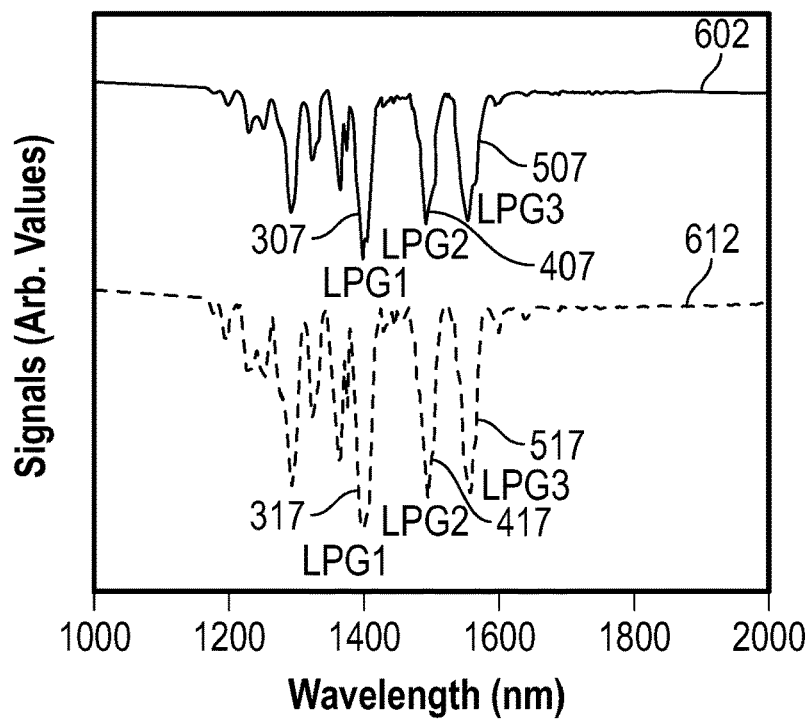
FIG. 6 depicts an example of measured transmitted and reflected spectrums of a combined first, second, and third LPGs.

Referring to FIG. 6, measured transmitted and reflected spectrums of a combined first, second, and third LPGs are depicted. FIG. 6 may correspond to FIG. 2, where the first LPG 202, the second LPG 204, and the third LPG 206 are combined in a single optical fiber core 102.

A transmitted spectrum 602 was obtained by passing an incident light signal through an optical fiber core and measuring a spectrum associated with the incident light signal at an opposite end of the optical fiber core without reflecting the incident light signal. The transmitted spectrum 602 may have multiple dips. The most prominent dips 307, 407, 507 may correspond to the same dips 307, 407, 507 shown in FIG. 3-5, which represent the highest order cladding modes. As such, the dips 307, 407, 507 may be at wavelengths of 1.4 μm (1400 nm), 1.5 μm (1500 nm), and 1.56 μm (1560 nm).

A reflected spectrum 612 was obtained by applying a metal coating as described herein, where the metal coating extends along a side of the optical fiber cladding for a length of 100 cm from the end facet. The reflected spectrum 612 also has the three prominent dips 317, 417, 517. Therefore, the reflected spectrum 612 is a good indicator of variations in wavelengths of the cladding modes. Further, because each of the LPGs (e.g., the LPGs 202, 204, 206) are independent from each other, three different external parameters may be independently measured simultaneously. For example, a shift in the wavelength of the dip 317 may indicate a change in a first external parameter (e.g., temperature) a change in the wavelength of the dip 417 may indicate a change in a second external parameter (e.g., strain), and a change in the wavelength of the dip 517 may indicate a change in a third external parameter (e.g., refractive index).

As such the system 200, as shown by the data in FIG. 6, may enable the simultaneous measurement of multiple external parameters through a reflected spectrum, whereas typical optical fiber sensors have been limited to using a transmitted spectrum to measure multiple parameters or have been limited to measuring a single parameter using a reflective spectrum. Other advantages may exist.

Figure 7:
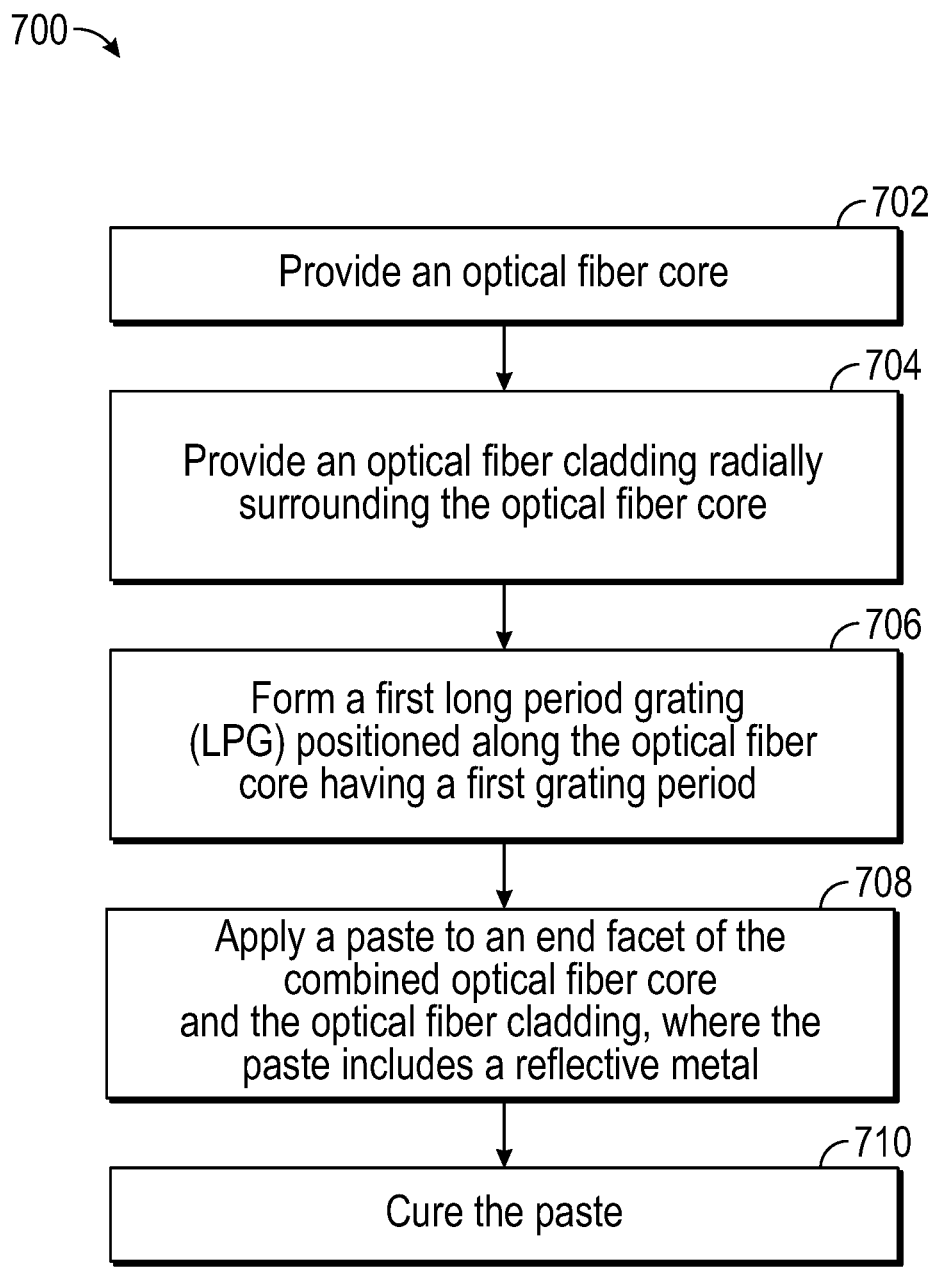
FIG. 7 is flow chart depicting an embodiment of a reflection mode sensor method.

Referring to FIG. 7, an embodiment of a reflection mode sensor method 700 is depicted. The method 700 may include providing an optical fiber core, at 702. For example, the system 100 may provide the optical fiber core 102.

The method 700 may further include providing an optical fiber cladding radially surrounding the optical fiber core, at 704. For example, the system 100 may provide the optical fiber cladding 104.

The method 700 may also include forming a first LPG positioned along the optical core having a first grating period, at 706. For example, the LPG 106 may be formed along the optical fiber core 102.

The method 700 may include applying a paste to an end facet of the combined optical fiber core and the optical fiber cladding, where the paste includes a reflective metal, at 708. For example, the metal coating 110 may be applied to the end facet 112 and to the side surface 114 as a paste. The paste may include a reflective metal, such as a silver compound, suspended in a solvent.

The method 700 may further include curing the paste, at 710. For example, a heat curing or chemical curing process may be applied, depending on the type of solvent used in the paste.

An advantage of the method 700 may be the formation of a metal coating, such as the metal coating 110 of FIG. 1, without the use of complex processes, such as evaporation deposition or sputtering. Other advantages may exist.

Figure 8:
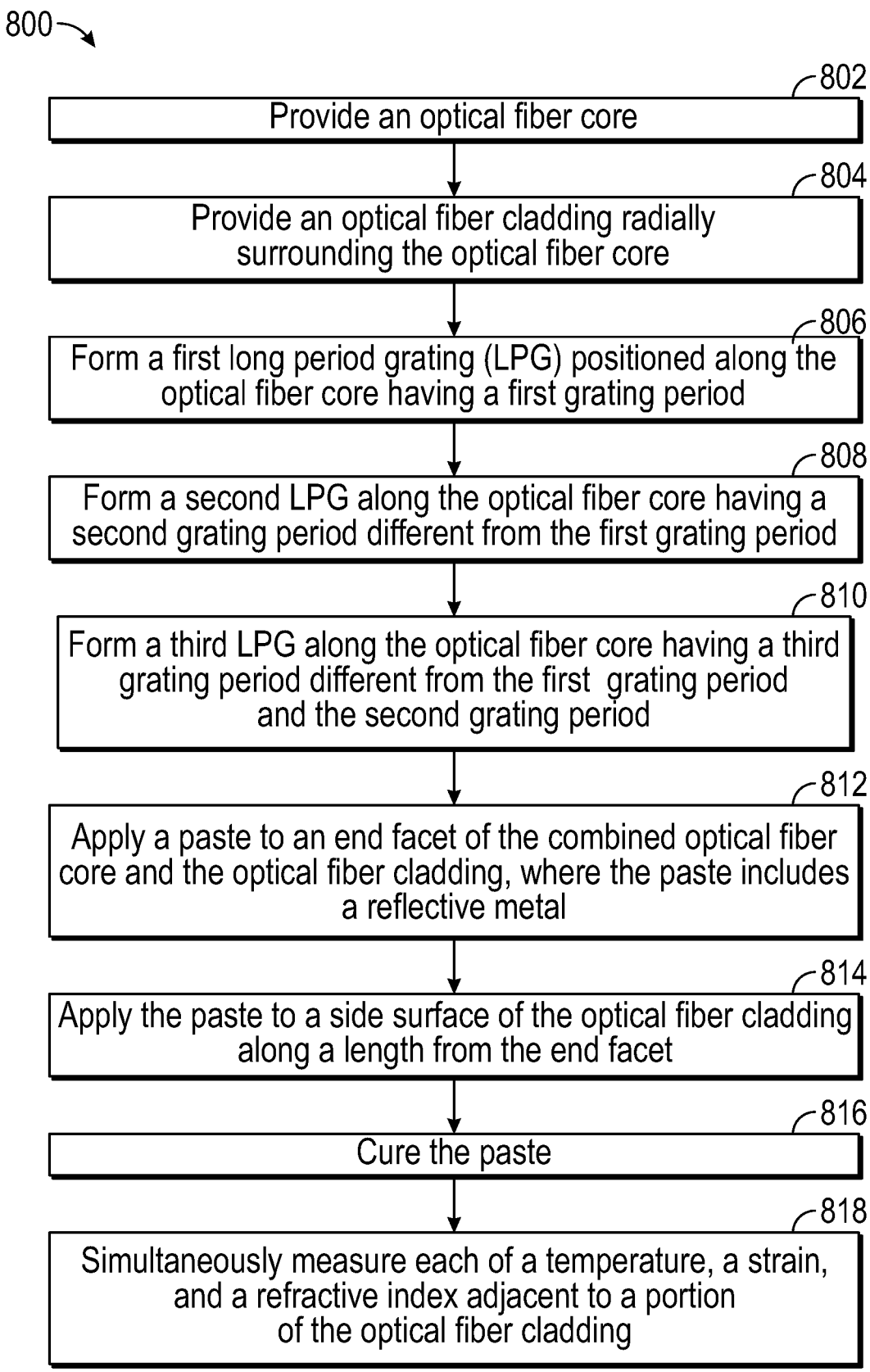
FIG. 8 is flow chart depicting an embodiment of a reflection mode sensor method.

Referring to FIG. 8, an embodiment of a reflection mode sensor method 800 is depicted. The method 800 may include providing an optical fiber core, at 802. For example, the system 200 may provide the optical fiber core 102.

The method 800 may further include providing an optical fiber cladding radially surrounding the optical fiber core, at 804. For example, the system 200 may provide the optical fiber cladding 104.

The method 800 may also include forming a first LPG positioned along the optical fiber core having a first grating period, at 806. For example, the first LPG 202 may be formed along the optical fiber core 102.

The method 800 may include forming a second LPG along the optical fiber core having a second grating period different from the first grating period, at 808. For example, the second LPG 204 may be formed along the optical fiber core 102.

The method 800 may further include forming a third LPG along the optical fiber core having a third grating period different from the first grating period and the second grating period, at 810. For example, the third LPG 206 may be formed along the optical fiber core 102.

The method 800 may also include applying a paste to an end facet of the combined optical fiber core and the optical fiber cladding, where the paste includes a reflective metal, at 812.

The method 800 may include applying the paste to a side surface of the optical fiber cladding along a length from the end facet, at 814. For example, the metal coating 110 may be applied to the end facet 112 and to the side surface 114 as a paste.

The method 800 may further include curing the paste, at 816. For example, a heat curing or chemical curing process may be applied, depending on the type of solvent used in the paste.

The method 800 may also include simultaneously measuring each of a temperature, a strain, and a refractive index adjacent to a portion of the optical fiber cladding, at 818. For example, the external parameters may be measured adjacent to the optical fiber cladding 104.

An advantage of the method 800 may be that by forming multiple LPGs along the optical core, multiple parameters, such as temperature, strain, and refractive index may be simultaneously measured based on a reflected light signal. Other advantages may exist.

Figure 9A:
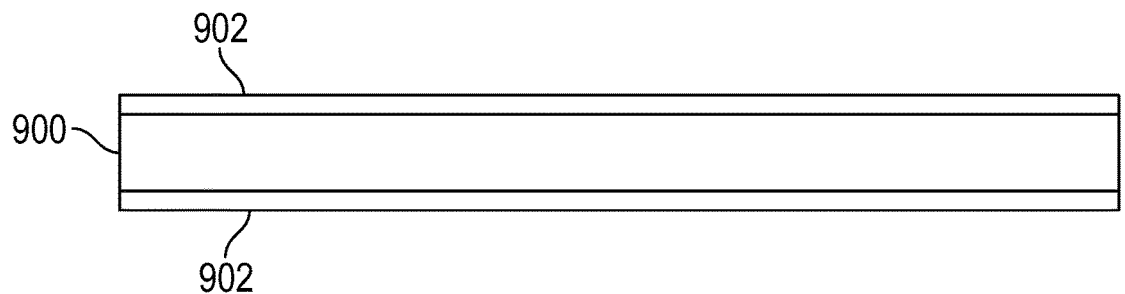
FIGS. 9A-9E depict an embodiment of an optical fiber at various stages of being coated with a reflective metal coating.

Referring to FIGS. 9A-9E, an optical fiber 900 is depicted at various stages of being coated with a metal coating. The optical fiber 900 may correspond to the optical fiber core 102 and the optical fiber cladding 104 of FIGS. 1 and 2. It should be noted that the depictions in FIGS. 9A-9E are not to scale. Rather, the drawings have been simplified and portions enlarged for clarity. FIG. 9A depicts the optical fiber 900 before processing. The optical fiber 900 may have an acrylate coating 902, which may be removed by using a fiber micro-stripper tool or chemical solution. The optical fiber 900 may then be cleaned, e.g., with isopropyl alcohol or another appropriate solvent, along a full length of the optical fiber 900. (total length of 2 m) was cleaned with IPA. Once the fiber was cleaned with IPA, a heat gun was used to dry the fiber for a few seconds. The fiber tip was cleaved at a distance of 56 cm from the grating end with the fiber cleaver machine to make sure the tip was flat.

Figure 9B:
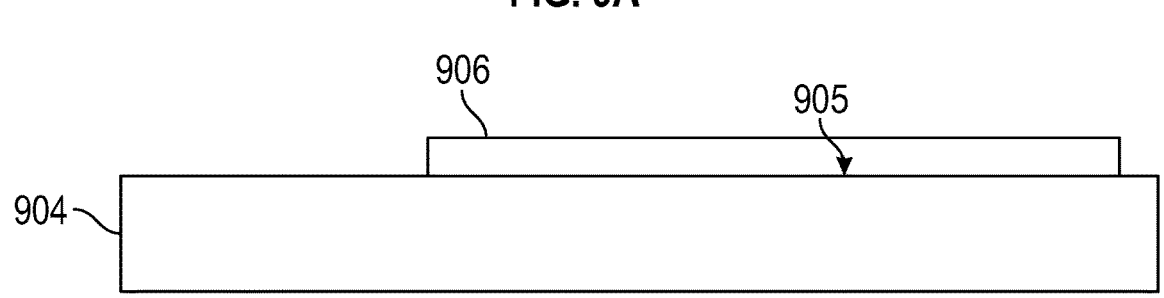

Referring to FIG. 9B, a first layer 906 of silver paste may be applied to a work surface 905. The first layer 906 may be sufficiently wide to cover a diameter of the optical fiber 900. In some embodiments, the work surface 905 may be a surface of a polyamide film, e.g., Kapton paper and/or tape. For example, a Kapton paper may be cleaned with isopropyl alcohol and dried. The Kapton paper may then be fixed to an optical table such that a surface (e.g., the surface 905) of the Kapton paper is flat. In some embodiments, the Kapton paper may have a length of at least 1 m and the silver paste may be poured on along a length of 56 cm. A diameter of the optical fiber may be 125 μm diameter, having a length of 1 m.

Figure 9C:
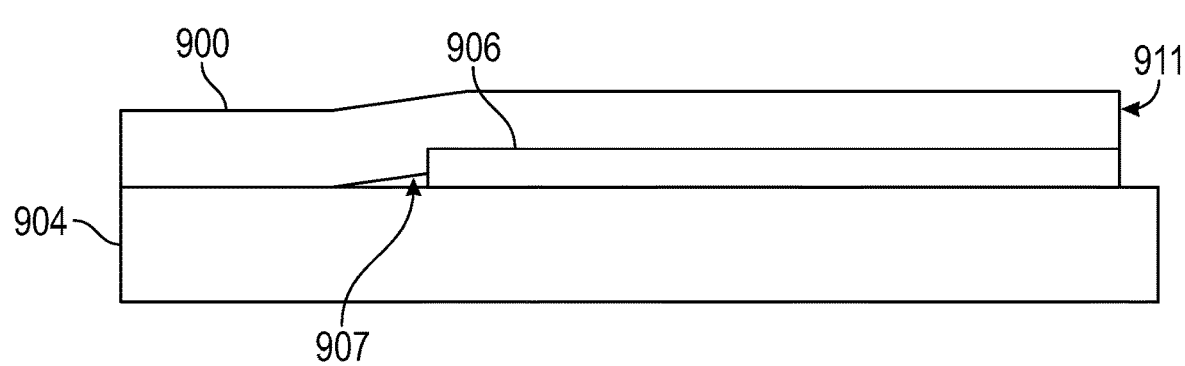

Referring to FIG. 9C, the optical fiber 900, with the acrylate coating 902 being removed, may be positioned onto the layer 906 of silver paste. By positioning the optical fiber 900 onto the layer 906 of silver paste, a surface of the optical fiber 900 may be coated in the silver paste on a first side 907 of the optical fiber 900 along a predetermined length from an end facet 911 of the optical fiber 900. Although not depicted in FIG. 9C, the optical fiber 900 may include the optical fiber core 102, which may have one or more LPGs formed therein. Care may be taken to ensure that that the silver paste is not positioned along a portion of the optical fiber 900 that overlaps any LPGs because a small amount of silver paste on the grating portion may change the characteristics of a final sensor. In some embodiments, 56 cm of the optical fiber 900 may be placed onto the layer 906 of silver paste.

Figure 9D:
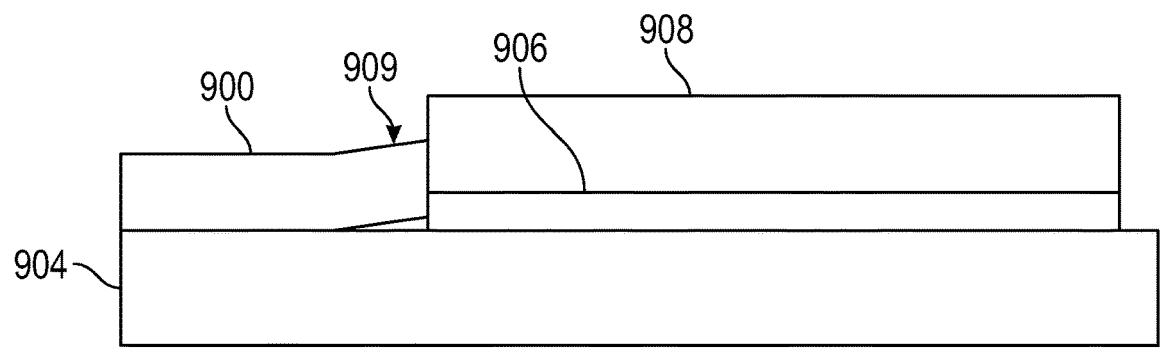

Referring to FIG. 9D, the silver paste may be brushed onto the optical fiber 900 to coat the surface of the optical fiber 900 in additional silver paste 908 on a second side 909 of the optical fiber 900 along the predetermined length from the end facet 911. For example, a brush may be used to coat an upper portion of the optical fiber 900 while the lower portion is already in the silver paste. While coating the optical fiber 900 with the brush, the optical fiber 900 may be moved slightly in a lateral direction with the brush to ensure complete coverage. The optical fiber 900 may then stand in the silver paste for 5 minutes.

Figure 9E:
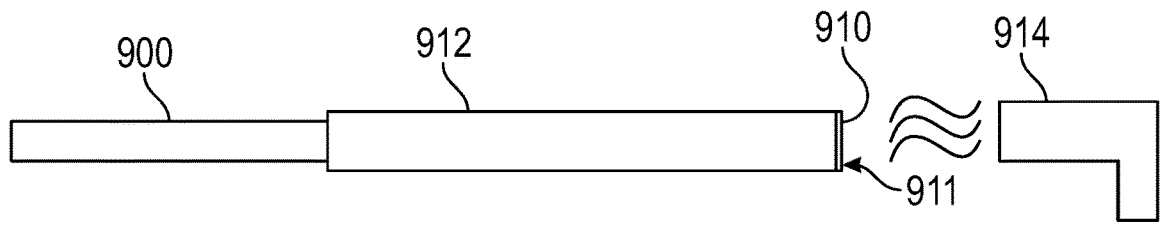

Referring to FIG. 9E, the optical fiber 900 may be lifted from the working surface 905 and a heat gun 914 may be used to dry the full coating 912 for 3-5 seconds. Then, the end facet 911 of the optical fiber 900 may be coated with additional silver paste 910 using a brush and dried. The process described in FIGS. 9A-9E may be performed multiple times to coat the optical fiber 900 with a sufficient depth of silver paste. Once the coating process is finished, the coated optical fiber 900 may be rested for 24 hours before curing. Once the coated optical fiber 900 is completely dry, it may be placed into a muffle furnace with the help of a glass tube for 2-5 minutes at 120° C. for curing.

The process described with reference to FIGS. 9A-9E may help reduce costs and complexity when compared with typical silver coating methods, which may include thermal evaporation/sputtering or electrodeless and electroplating methods. Other advantages may exist.

Figure 10:
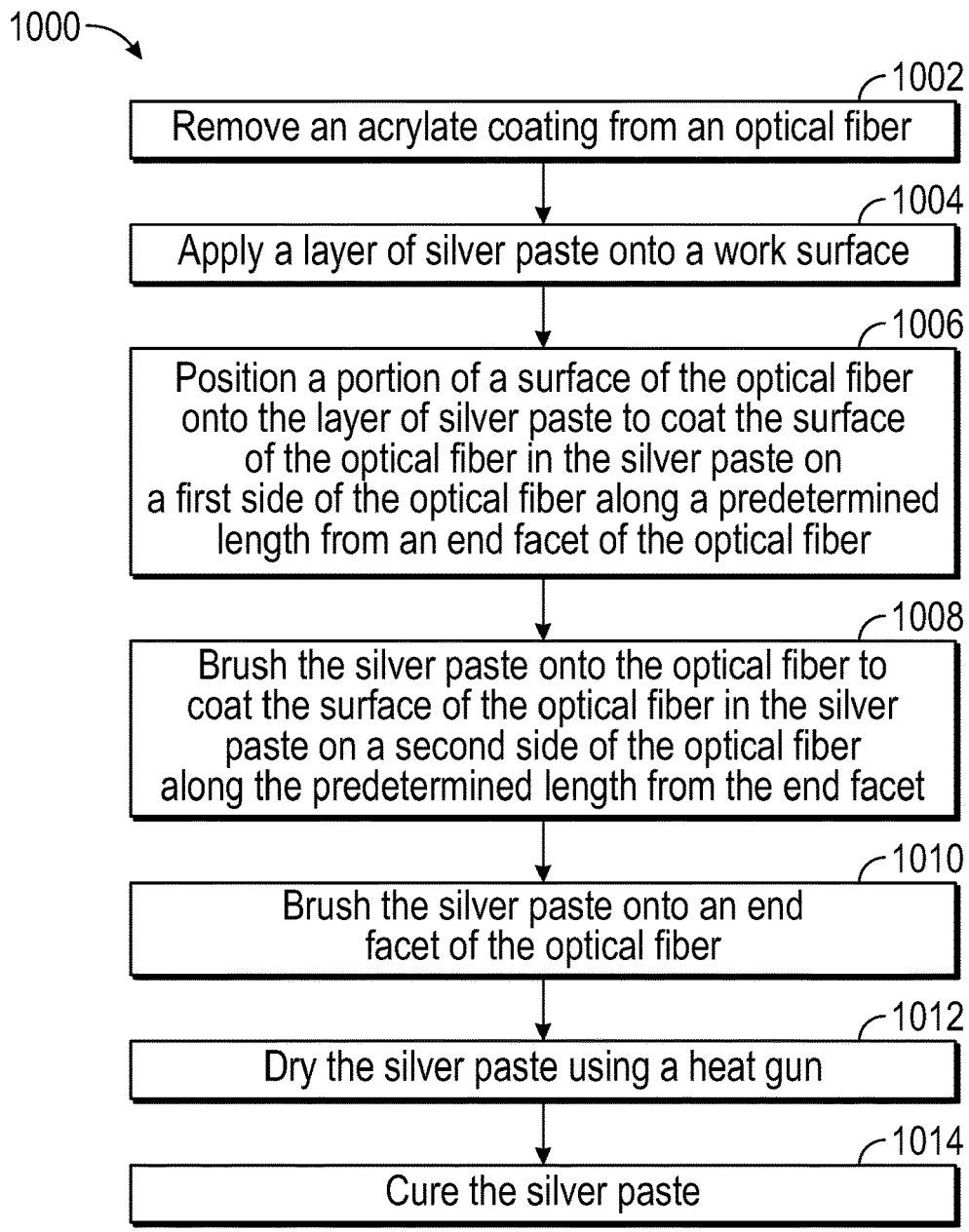
FIG. 10 is a flow chart depicting an embodiment of a method for coating an optical fiber for use as a reflection mode sensor.

Referring to FIG. 10, an embodiment of a method 1000 for coating an optical fiber is depicted. The method 1000 may include removing an acrylate coating from an optical fiber, at 1002. For example, the acrylate coating 902 may be removed from the optical fiber 900.

The method 1000 may further include applying a layer of silver paste onto a work surface, at 1004. For example, the layer 906 of silver paste may be applied to the work surface 905.

The method 1000 may also include positioning a portion of a surface of the optical fiber onto the layer of silver paste to coat the surface of the optical fiber in the silver paste on a first side of the optical fiber along a predetermined length from an end facet of the optical fiber, at 1006. For example, the optical fiber 900 may be positioned onto the layer 906 of silver paste to coat the first side 907.

The method 1000 may include brushing the silver paste onto the optical fiber to coat the surface of the optical fiber in the silver paste on a second side of the optical fiber along the predetermined length from the end facet, at 1008. For example, the additional silver paste 908 may be brushed onto the second side 909.

The method 1000 may further include brushing the silver paste onto an end facet of the optical fiber, at 1010. For example, the additional silver paste 910 may be brushed onto the end facet 911.

The method 1000 may also include drying the silver paste using a heat gun, at 1012. For example, the heat gun 914 may be used to dry the full coating 912 of silver paste. The method 1000 may include curing the silver paste, at 1014.

Figure 11:
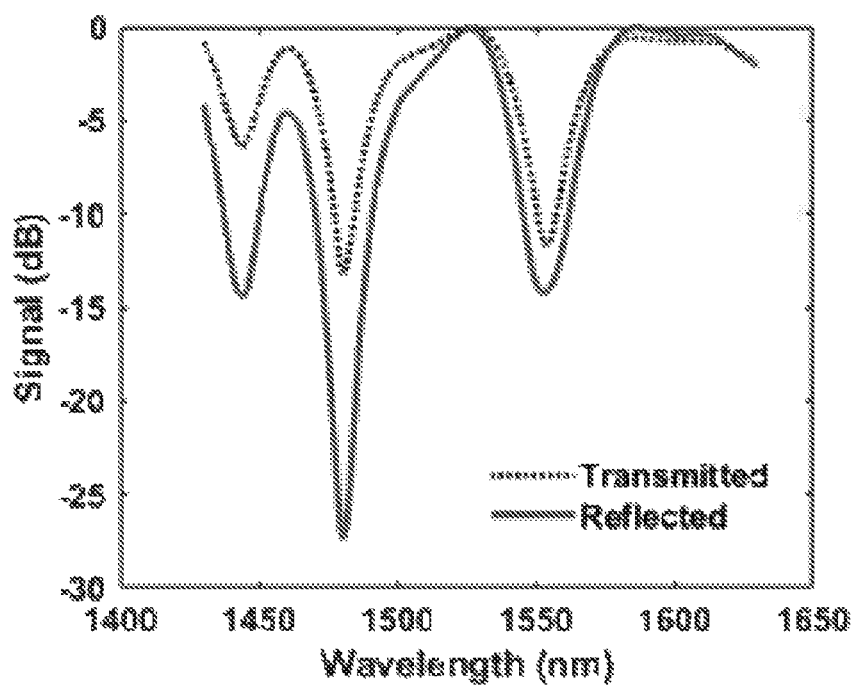
FIG. 11 is a chart depicting experimental results of an embodiment of a reflection mode sensor system.

Referring to FIG. 11, experimental results of an embodiment of a reflection mode sensor system are depicted. A metal coating was applied to a commercially available LPG with a grating period of 450 μm. The fiber included a single LPG. The coating length was 60 cm. Based on the experimental result, it can be said that the aforementioned discussed coating method works successfully for LPG to provide a reflected spectrum that completely mimics the transmitted spectrum with reduced intensity.

Although various embodiments have been shown and described, the present disclosure is not so limited and will be understood to include all such modifications and variations as would be apparent to one skilled in the art.

What is claimed is:

1. A reflection mode sensor system comprising:
an optical fiber core;
an optical fiber cladding radially surrounding the optical fiber core;
a first long period grating (LPG) positioned along the optical fiber core having a first grating period;
a second LPG along the optical fiber core having a second grating period different from the first grating period, and
a third LPG along the optical fiber core having a third grating period different from the first grating period and the second grating period.

2. The system of claim 1, wherein the first LPG and the second LPG enable simultaneous measurement of both a temperature and a strain adjacent to a portion of the optical fiber cladding.

3. The system of claim 1, wherein a distance between the first LPG and the second LPG is 1 mm.

4. The system of claim 1, wherein the first LPG, the second LPG, and the third LPG enable simultaneous measurement of each of a temperature, a strain, and a refractive index adjacent to a portion of the optical fiber cladding.

5. The system of claim 1, further comprising a metal coating applied to an end facet of the optical fiber core and the optical fiber cladding.

6. The system of claim 5, wherein the metal coating includes a paste applied to the optical fiber core and the optical fiber cladding, wherein the paste has been cured, and wherein the paste includes a reflective metal.

7. The system of claim 5, wherein the metal coating includes silver, aluminum, gold, or a combination thereof.

8. The system of claim 5, wherein the metal coating covers a portion of a side surface of the optical fiber cladding along a length from the end facet.

9. The system of claim 8, wherein the length is at least 1 cm or wherein the length is at least 100 cm.

10. A reflection mode sensor system comprising:
an optical fiber core;
an optical fiber cladding radially surrounding the optical fiber core;
a first long period grating (LPG) positioned along the optical fiber core having a first grating period; and
a metal coating applied to an end facet of the optical fiber core and the optical fiber cladding, wherein the metal coating covers a side surface of the optical fiber cladding along a length from the end facet.

11. The system of claim 10, further comprising:
- a second LPG along the optical fiber core having a second grating period different from the first grating period; and
- a third LPG along the optical fiber core having a third grating period different from the first grating period and the second grating period.

12. The system of claim 11, wherein the first LPG, the second LPG, and the third LPG enable simultaneous measurement of each of a temperature, a strain, and a refractive index adjacent to a portion of the optical fiber cladding.

13. The system of claim 10, wherein the metal coating includes a paste applied to the optical fiber core and the optical fiber cladding, wherein the paste has been cured, and wherein the paste includes a reflective metal.

* * * * *